United States Patent [19]
Abel, Jr. et al.

[11] Patent Number: 6,150,498
[45] Date of Patent: Nov. 21, 2000

[54] POLYMER RECOVERY

[75] Inventors: Richard C. Abel, Jr.; Michael E. Rowland; Robert B. Combs, all of Lake Jackson; Jerry W. Soape, Beaumont; Stanley W. Smith, Lake Jackson, all of Tex.

[73] Assignees: The Dow Chemical Company, Midland, Mich.; E. I. du Pont de Nemours and Company, Wilmington, Del.

[21] Appl. No.: 08/887,860

[22] Filed: Jul. 3, 1997

Related U.S. Application Data
[60] Provisional application No. 60/021,678, Jul. 12, 1996.

[51] Int. Cl.⁷ .................................................. C08G 75/14
[52] U.S. Cl. ......................... 528/388; 528/481; 528/499; 528/500; 528/501; 159/47; 159/49
[58] Field of Search .................................... 528/388, 481, 528/499, 500, 501; 159/47, 49

[56] References Cited

U.S. PATENT DOCUMENTS

| | | | |
|---|---|---|---|
| 3,778,907 | 12/1973 | Kuntz et al. | 34/57 |
| 3,834,440 | 9/1974 | McCracken | 159/47 R |
| 3,874,090 | 4/1975 | McCracken | 34/61 |
| 4,310,973 | 1/1982 | King | 34/10 |
| 4,318,773 | 3/1982 | Ullrich et al. | 159/47 R |
| 4,413,971 | 11/1983 | Nettleton | 425/311 |
| 4,575,253 | 3/1986 | List et al. | 366/331 |
| 4,634,761 | 1/1987 | Mendiratta et al. | 528/500 |
| 4,639,507 | 1/1987 | Alewelt et al. | 528/388 |
| 4,650,338 | 3/1987 | List et al. | 366/85 |
| 4,824,257 | 4/1989 | List et al. | 366/99 |
| 4,889,431 | 12/1989 | Liechti et al. | 366/99 |
| 4,909,898 | 3/1990 | Padliya et al. | 159/47.1 |
| 4,941,130 | 7/1990 | List et al. | 366/99 |
| 4,950,081 | 8/1990 | List | 366/85 |
| 4,952,672 | 8/1990 | Moore et al. | 528/481 |
| 4,954,303 | 9/1990 | Moore et al. | 264/101 |
| 5,041,249 | 8/1991 | Yeh | 264/85 |
| 5,121,992 | 6/1992 | List et al. | 366/303 |
| 5,147,135 | 9/1992 | List et al. | 366/303 |
| 5,407,266 | 4/1995 | Dötsch et al. | 366/97 |
| 5,407,974 | 4/1995 | Dallmeyer | 523/328 |
| 5,453,158 | 9/1995 | Cummings et al. | 159/47.1 |
| 5,489,381 | 2/1996 | Day et al. | 210/302 |
| 5,489,383 | 2/1996 | Yoshikawa | 210/413 |

FOREIGN PATENT DOCUMENTS

| | | | |
|---|---|---|---|
| 0 102 122 | 3/1984 | European Pat. Off. | B29F 3/00 |
| 0 226 204 | 6/1987 | European Pat. Off. | C08F 6/10 |
| 0 359 432 | 3/1990 | European Pat. Off. | C08F 6/10 |
| 0 369 708 | 5/1990 | European Pat. Off. | B01D 3/06 |

OTHER PUBLICATIONS

International Search Report Dated Nov. 10, 1997 issued by the EPO acting as the International Searching Authority in PCT US 97/10102.

List–Discotherm: For Thermal Processes With Free Flowing Products, By: LIST.

Equipment and Systems for Thermal Processing of Highly Viscous, Crusting, and Free Flowing Products, By: LIST.

*Primary Examiner*—Terressa M. Boykin

[57] ABSTRACT

Methods for devolatilizing polymer solutions have been invented which include, in certain aspects, dissolving a viscous polymer in a solvent forming a polymer-solvent solution, introducing the polymer-solvent solution into a thermal dryer, heating or cooling the polymer-solvent solution in the thermal dryer forming product polymer with solvent removed and separated solvent (which may include other residuals), the separated solvent with other residuals if present vaporizing in the thermal dryer forming a vapor, removing the vapor from the thermal dryer, and discharging product polymer from the thermal dryer.

27 Claims, 8 Drawing Sheets

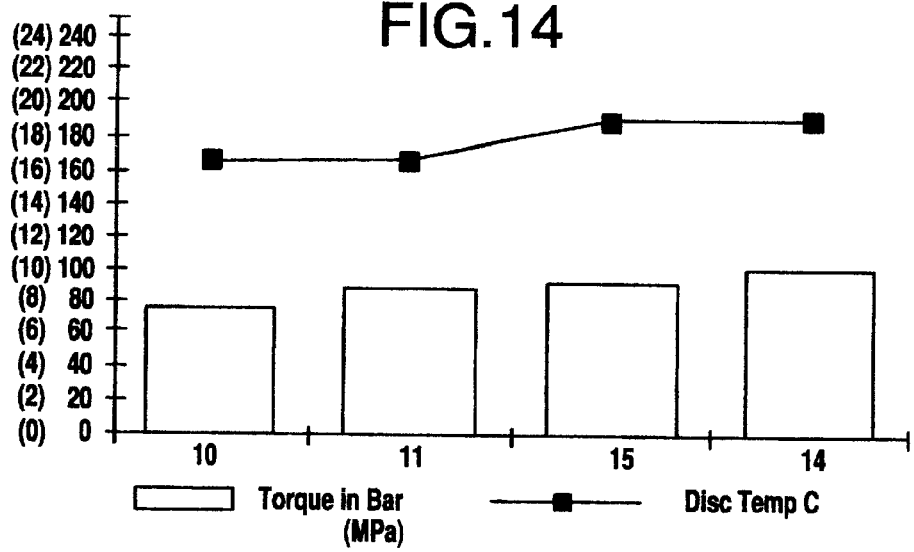
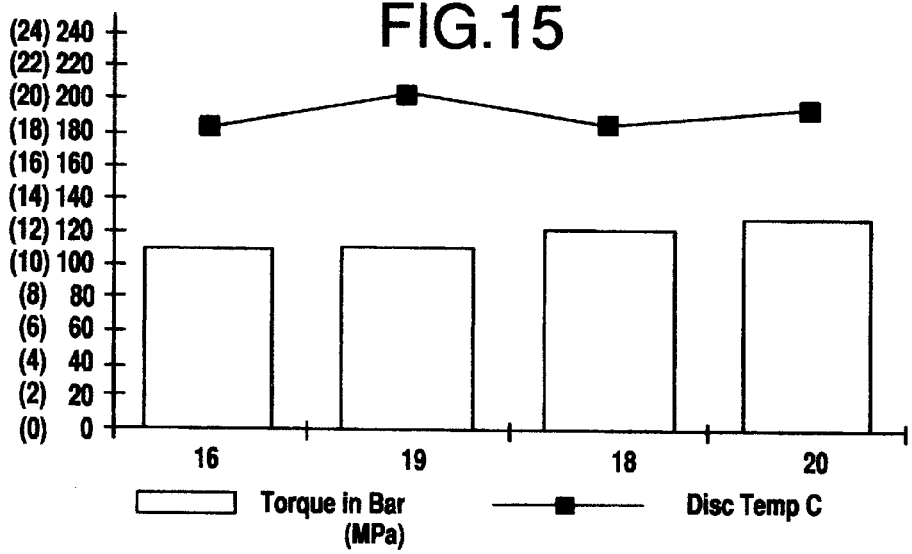
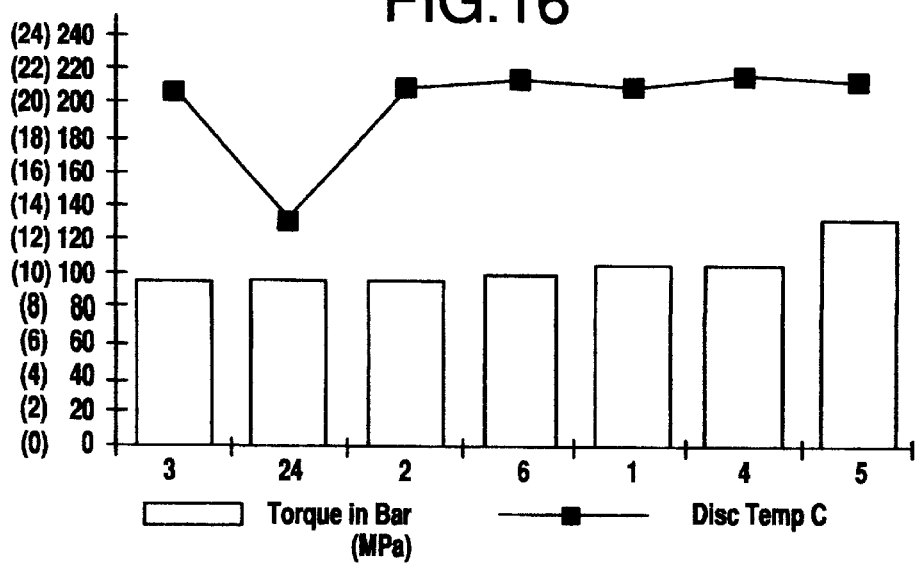

6,150,498

POLYMER RECOVERY

This Appln claims the benefit of U.S. Provisional No. 60/021,678, filed Jul. 12, 1996.

BACKGROUND OF THE INVENTION

1. Field of the Invention

This invention is directed to polymer devolatilization and recovery and, in certain aspects, to production of a polymer product with a residuals level of less than one thousand parts per million(ppm), the polymer product being produced from an initial polymer solution having a residuals level of up to fifty percent by weight, based on polymer weight. One particular method according to this invention is directed to the devolatilization of ethylene propylene diene monomer terpolymer (EPDM).

2. Description of Related Art

The prior art discloses a wide variety of polymer devolatilization and recovery systems and methods. Certain prior art methods have one or more disadvantages: a multi-stage process including a finishing step; required stripping of contaminants, residual solvent, and monomers; use of an immiscible fluid mixed with a flowing polymer to maintain heat transfer coefficient, increase diffusion driving force, or lower partial pressure; entrainment of polymer in overhead venting systems, known as "snowing", and polymer product flowing into venting systems, known as "vent flooding"; production of polymer product with inconsistent properties, such as a varying viscosity, or production of degraded product polymer or gels; and additional process unit operations to remove immiscible liquid or gas.

There has long been a need for an efficient, effective, single stage method for devolatilizing viscous polymers. There has long been a need for such a method which is relatively less expensive than existing methods and requires reduced capital outlay compared to existing methods. There has long been a need for such a method which produces a quality product with consistent properties without unacceptable viscosity variance, and without product degradation. There has long been a need for such a method which does not require additional stripping, an additional finishing step, or use of an immiscible fluid to maintain heat transfer. There has long been a need for such a method in which snowing and vent flooding are significantly reduced and thereby improving product quality.

SUMMARY OF THE PRESENT INVENTION

The present invention discloses systems and methods for polymer devolatilization. Devolatilization is the removal from a polymer product of unreacted monomer, solvent, oligomers, and volatile condensation products, referred to herein collectively as "residuals".

In one aspect, the subject invention is directed to a method comprising a single iteration of the following sequential steps:

(A) introducing a polymer-solvent solution having a solvent plus residuals content of less than about 80 weight percent into a thermal dryer, (B) treating the polymer-solvent solution in the thermal dryer forming product polymer and separated solvent, separated solvent with residuals therein vaporizing in the thermal dryer forming a vapor containing solvent and residuals, (C) removing the vapor from the thermal dryer, and (D) discharging polymer product having a solvent level of not more than 0.5 percent by weight solvent and other residuals from the thermal dryer.

In another aspect, a method according to the present invention includes: conveying a viscous polymer in solution with a solvent into a treatment vessel of a thermal dryer for devolatilization; applying a reduced pressure or vacuum within the treatment vessel; removing at least a portion of residuals contained in the viscous polymer solution by way of the vacuum within the treatment vessel; and flowing polymer product from the treatment vessel for further processing, such as pelletizing.

In another aspect the method includes a step of cooling or heating the viscous polymer solution in the treatment vessel to maintain polymer at desired temperature to achieve low residuals with acceptable product quality. In one aspect, such a method is oxygen-free.

Methods according to this invention may be either batch or continuous and may be used to recover any known viscous polymer. Methods according to this invention may be hydrous, or anhydrous (that is, in the absence of water), and an optional volatile stripping agent may be used. Use of an immiscible heat transfer fluid is optional.

In certain embodiments, the viscous polymer solution is produced using a dissolver extruder that is fed pelletized polymer by a volumetric feeder. Solvent is injected into the dissolver extruder under high pressure (for example 2000 pounds/square inch gauge (psig) (13.8 MPa)) by a high pressure injection system. With such a system, solvent under pressure is injected into a polymer-filled zone in the dissolver extruder.

In another embodiment, the viscous polymer solution is produced in one or more solution polymerization reactors, operated either in parallel or in series. One such system is described in commonly owned U.S. Pat. No. 3,914,342 (Mitchell), the disclosure of which is incorporated by reference for all purposes. Preferably, the viscous polymer solution is conveyed from the reactor(s) to the thermal dryer via single or multiple flash vessels to reduce solvent content.

A useful method to simulate this polymer recovery process is a dissolver extruder having six barrel sections through which polymer flows. Five of the six barrel sections are heated by a fluid media, for example hot oil, pumping system. In certain preferred embodiments, the first of the six barrel sections is cooled, for example to about 30 degrees C. (°C.), to prevent polymer bridging at a polymer inlet of the dissolver extruder. A chilled glycol system provides sufficient cooling.

An electric, pneumatic, or hydraulic power system is used, in certain embodiments, to drive a rotating shaft in the dryer's treatment vessel to facilitate polymer drying and movement through the vessel. In one such aspect, the shaft is directly driven by an electric motor with a gear reducer. The shaft is desirably sealed from exterior environments with a double mechanical seal with an inert buffer fluid (such as an oil buffer). In an additional aspect, a discharge end of the shaft also penetrates an exterior shell and is sealed with a double mechanical seal with an inert buffer (such as an oil buffer) and is supported by one or more external bearings.

One vacuum system useful with methods according to the present invention has an oil-sealed vacuum pump and a condenser (such as a shell and tube heat exchanger) disposed between the pump and a vent outlet of the treatment vessel. In one aspect, dual vapor collection traps are used alternately. Appropriate gauges indicate vacuum levels at desired points in the system.

In one embodiment, a single screw discharge device is used to convey polymer from the thermal dryer to downstream processing equipment. Twin screw or gear pump discharge devices are also suitable.

Further processing of devolatilized polymer product flowing from the treatment vessel may include cooling, drying, and packaging. One method includes running the polymer product through a water bath and then pelletizing it in a pelletizing machine (such as a machine commercially available from Cumberland Strand Chopper Co.).

Methods according to this invention, as shown by the data presented below, produce substantially improved and unexpected results as compared to various prior art methods.

In certain embodiments, the present invention discloses a method for devolatilizing a polymer-solvent solution, the method including conveying the polymer-solvent solution into a thermal dryer or forming the solution therein by introducing polymer and solvent into the thermal dryer, treating the polymer-solvent solution in the thermal dryer to separate polymer product from solvent and residuals, vaporizing at least a portion of the solvent (or solvent with residuals therein) in the thermal dryer thereby forming a vapor containing solvent (or solvent and other residuals), removing the vapor from the thermal dryer, and discharging polymer product having at most 0.5 percent total residuals (including solvent) by weight from the thermal dryer. The polymer product has a solvent level that is desirably less than 2000 ppm, preferably less than 1600 ppm, more preferably less than 1000 ppm. The polymer product also has a residual termonomer content (such as a diene) in the polymer product of less than 100 ppm, preferably less than 50 ppm, and especially less than 10 ppm. The discharged polymer product is suitable for processing by a pelletizing machine. The method thus includes feeding the polymer product to a pelletizing machine, and producing pelletized polymer product. The polymer has a Mooney viscosity that is desirably greater than about 20, preferably greater than about 50, more preferably about 70 or greater and generally can be as high as about 250, preferably as high as about 120; or a melt index ($I_2$) (ASTM D-1238 Condition 190/2.16) of less than about 1 g/10 minutes to as low as about 0.001 g/10 minutes.

The polymer is desirably selected from the group consisting of ethylene/propylene/diene terpolymers (EPDM), heterogeneous polyethylene, homogeneous polyethylene, linear polyethylene, low density polyethylene, polypropylene, polyurethane, ethylene propylene rubbers, and polystyrene. Residence time of the polymer-solvent solution in the thermal dryer is desirably less than 50 minutes, preferably less than 30 minutes and especially 15 minutes or less; Residuals initially present in the polymer-solvent solution are typically at a level of between about 5 percent and about 80 percent by weight and are reduced by this method to a level in the polymer product of less than about 0.5 percent by weight; preferably less than about 0.2 percent by weight. The residuals initially present in the polymer-solvent solution at a level of 10 percent to 50 percent by weight are preferably reduced to a level of less than 1000 ppm, or when residuals are present initially at a level of 2–25 percent are reduced to a level of 500 ppm or less, in the product polymer. The solvent is typically a $C_5$ hydrocarbon or heavier, typically up to a $C_{10}$ hydrocarbon, or mixture of such hydrocarbons.

The method may also be performed without the addition of oxygen, water or both. The method includes a variation wherein polymer and solvent are continuously fed to the thermal dryer and polymer product is continuously produced by and conveyed from the thermal dryer. The method may be a batch method.

Polymer product discharged from the thermal dryer is desirably received by a discharge apparatus which conveys the polymer product from the thermal dryer. The discharge apparatus desirably is a discharge system with a housing, a single screw conveyor rotatably mounted therein, and a direct drive motor for rotating the single screw conveyor. The single screw conveyor is preferably mounted in bearings and sealed at its drive end with double mechanical seals to isolate components from the housing from external influences such as atmospheric gases, particularly oxygen. The housing has an inlet and an outlet and the system desirably runs under vacuum, for example 10–200 mm Hg (1.3–26.7 kPa), preferably about 25 mm Hg (3.3 kPa).

The method also includes heating or cooling the polymer-solvent solution in the thermal dryer using dryer temperatures maintained between 50° C. and 290° C., preferably between 125° C. and 290° C., more preferably between 150° C. and 220° C.

The method also may residual removing vapor by a vacuum system that is in fluid communication with the thermal dryer. The method from then includes condensing and collecting solvent from the vapor removed by the vacuum system. The method further comprises injecting nitrogen into the thermal dryer ("nitrogen sweeping"). The polymer product desirably has a viscosity that is substantially the same as that of polymer used to form the polymer-solvent solution.

It is, therefore, an object of at least certain preferred embodiments of the present invention to provide:

New, useful, unique, efficient, nonobvious methods and systems for devolatilizing polymers;

Such methods which reduce residuals in a polymer from an initial 5 percent to 80 percent content by weight to less than 0.5 percent, especially less than 0.2 percent by weight; and such methods which preferably reduce residuals in a polymer from an initial 10 percent to 50 percent content by weight to less than about 1000 ppm; and such methods which more preferably reduce residuals in a polymer from an initial 5–25 percent solvent content by weight to less than about 500 ppm.

Such methods which achieve an acceptable polymer residuals level in a single stage device;

Such methods which require no stripping and no immiscible fluids to maintain heat transfer and diffusion rate;

Such methods in which snowing and vent flooding are reduced and, preferably, substantially reduced; and Such methods in which product polymer quality is consistent, and such method in which a variety of varying molecular weight solvents may be used (for example, isobutane, cyclohexane, or ISOPAR™ E (a trademark of and made by Exxon Chemical which is typically a mixture of $C_8$–$C_{10}$ hydrocarbons)).

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefit of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements. Further,,the term "solution" as used herein may include a slurry.

DESCRIPTION OF THE DRAWINGS

A more particular description of embodiments of the invention briefly summarized above may be had by reference to the embodiments which are shown in the drawings which form a part of this specification. These drawings illustrate certain preferred embodiments and are not to be used to improperly limit the scope of the invention which may have other equally effective or legally equivalent embodiments.

FIGS. 7–16 present data for methods according to the present invention.

DESCRIPTION OF EMBODIMENTS PREFERRED AT THE TIME OF FILING FOR THIS PATENT

Figure 1:
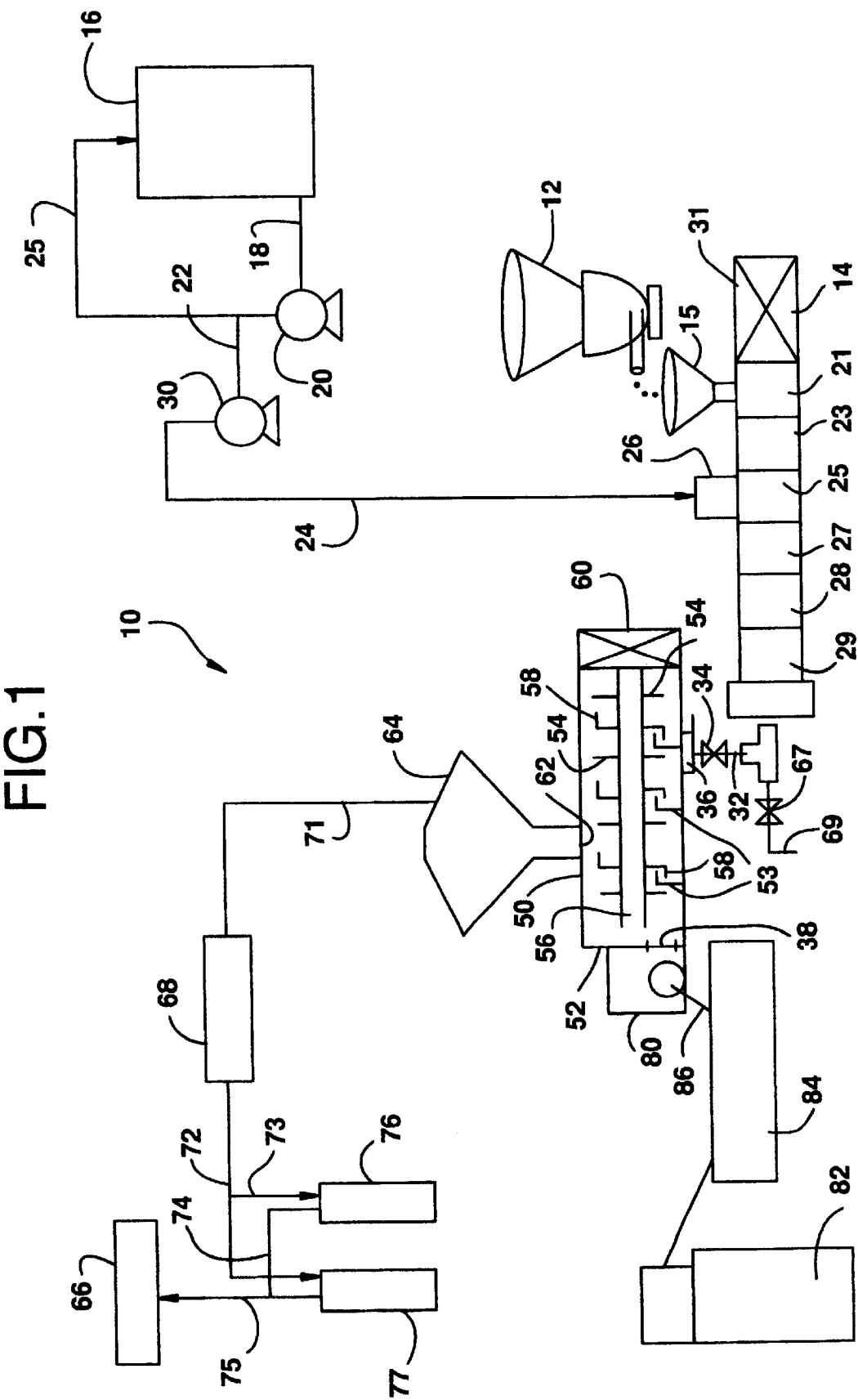
FIG. 1 is a schematic view of a system useful in studying the methods according to the present invention without the need to use a polymer reaction process as a feed stream.

Referring now to FIG. 1, a system 10 according to the present invention has a volumetric feeder 12 for feeding pelletized polymer to an inlet funnel 15 of a dissolver extruder 14; a thermal dryer 50; a solvent tank 16; and a vacuum system 66.

Solvent is pumped from the solvent tank 16 via lines 18 and 22 by a pump 20 to a pump 30. Pump 30 pumps the solvent through line 24 to an injector system 26. Injector system 26 injects the solvent into a third zone or barrel 25 of dissolver extruder 14.

Figure 2:
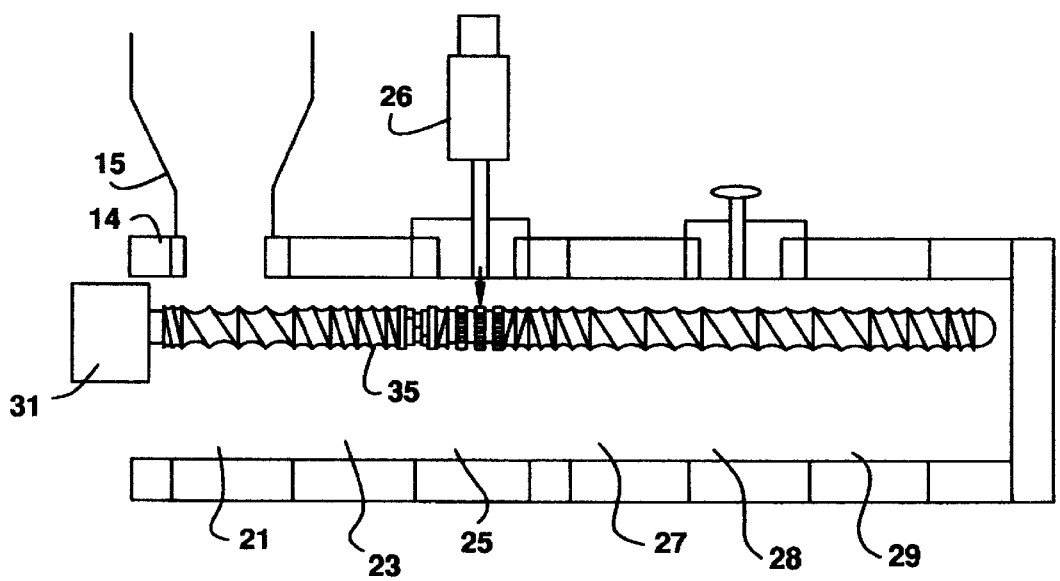
FIG. 2 is a partial schematic view in cross-section of the dissolver extruder of the system of FIG. 1.
Figure 3:
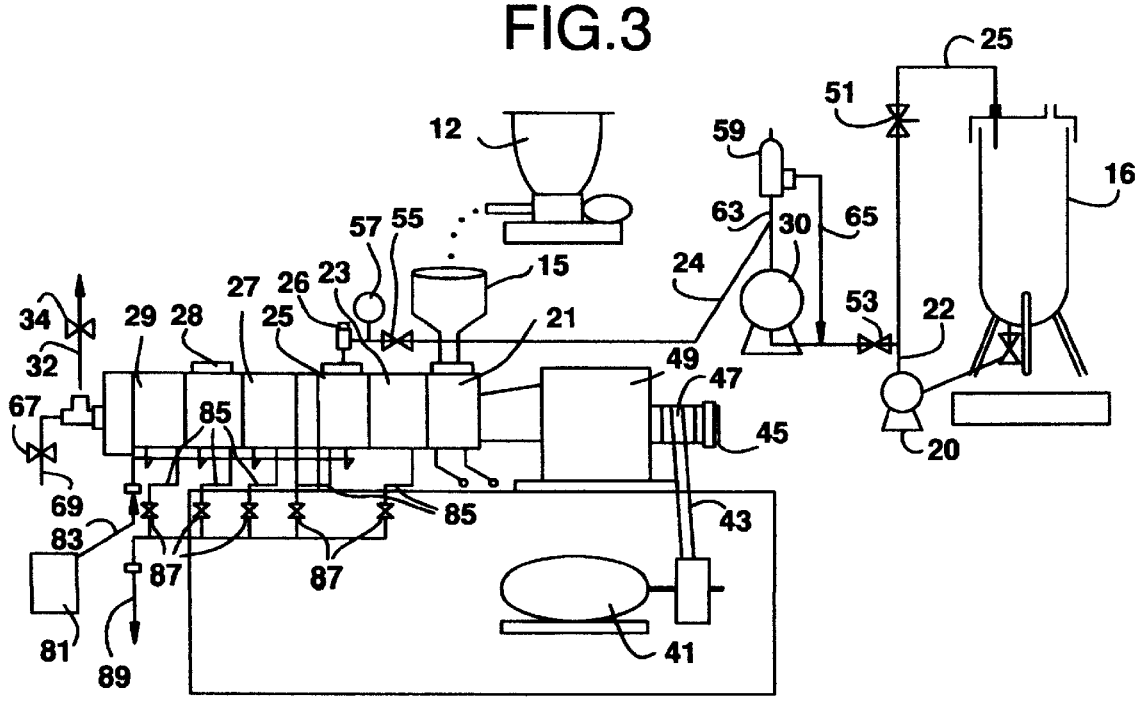
FIG. 3 is a schematic view of part of the system of FIG. 1.

As shown in FIGS. 2 and 3, shaft 35 of dissolver extruder 14 is rotated by a drive system 31 that includes an electric motor 41, a drive belt 43, a high torque slip clutch 45, a drive pulley 47 and a gear system 49 that is interconnected with shaft 35. A valve 51 controls flow in line 19. A valve 53 controls flow in line 22. A valve 55 controls flow in line 24. A gauge 57 indicates pressure in line 24. An adjustable relief valve 59 provides relief protection for pump 30 and is in communication with valve 55 via the lines 63 and 65. As shown in FIG. 3, valve 67 controls the flow of polymer-solvent solution in sample line 69.

Hot oil from a hot oil source 81 flows via line 83 to the barrel sections 23, 25, 27, 28 and 29 of dissolver extruder 14. Hot oil exits these sections via lines 85, each with its own control valve 87, and exit line 89. Dissolver extruder 14 produces a flowing solution of viscous polymer and solvent which is fed via line 32 to thermal dryer 50 (FIG. 1). Valve 34 controls delivery of polymer solution to dryer 50.

Figure 4:
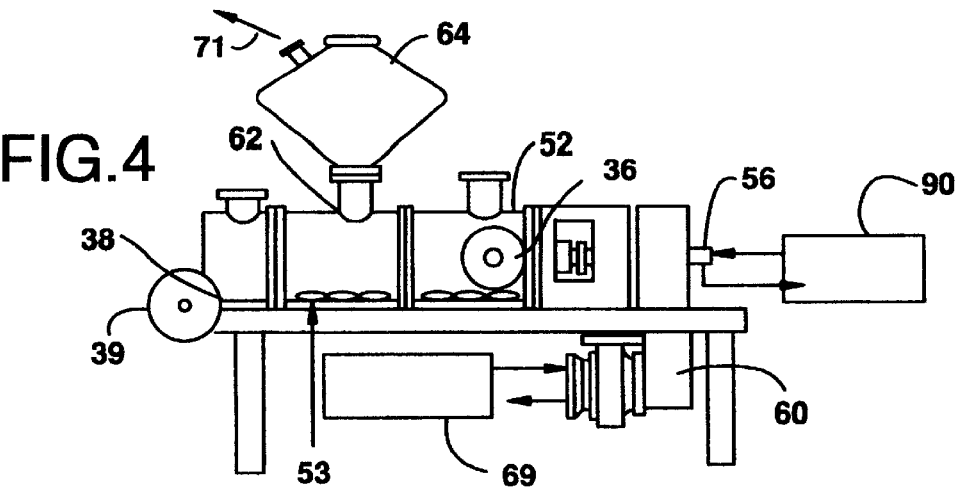
FIG. 4 is a side schematic view of the thermal dryer of the system of FIG. 1.

Thermal dryer 50 (see FIGS. 1 and 4) has a shell 52 and an apparatus therein for heating the flowing solution of polymer and solvent and for moving it from inlet 36 to outlet 38. Typically a rotating hollow shaft 56 with mixing and conveying elements 54 and 58 working in combination with counter hooks 53 on the interior of shell 52 kneads and moves the polymer-solvent solution within shell 52. The shell, rotating shaft, counter hooks, movement elements, and mixing elements may all serve as thermal transfer members for heating or cooling the polymer-solvent solution. Heat transfer media (such as steam or hot oil) may be pumped through a channel or channels in each of these members. As shown in FIG. 4, a hot oil system 90 is used in one embodiment to flow heat transfer media through shaft 56 and related members. A drive system 60 is interconnected with and rotates shaft 56 (FIGS. 1 and 4). A source of hydraulic fluid under pressure (not shown) provides drive fluid to drive system 60.

Certain residuals freed from the polymer-solvent solution (for example vaporized volatiles, vaporized solvent, unreacted monomers, oligomers) rise within vessel 52 and flow through an upper outlet 62. In one embodiment, these residuals flow into a vent dome 64 (FIGS. 1 and 4). A vacuum system 66 evacuates the residuals from shell 52 via lines 71, 72, 73, 74 and 75. Residuals are condensed in a condenser 68 and collected in trap 76 or trap 77. The remaining residuals are removed via line 75.

Polymer product exits shell 52 of thermal dryer 50 and is moved through cooling medium 84 via line 86 into a cutter apparatus 82 to packaging equipment (not shown) (FIG. 1).

Figure 5A:
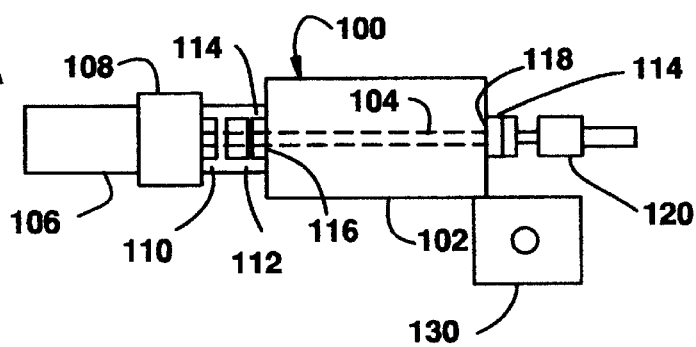
FIG. 5A is a schematic view of a thermal dryer and associated apparatus useful in methods according to the present invention.

FIG. 5A illustrates one embodiment of a thermal dryer 100 (like the dryer 50) and associated apparatuses and connections. Dryer 100 has a hollow housing 102 with a shaft 104 extending therethrough for agitating and moving a polymer-solvent solution flowing into housing 102 through an inlet 116 (like the inlet 36, FIG. 1) into housing 102. Shaft 104 is rotated by a direct drive motor 106 interconnected with a gear box 108. External thrust bearings 110 and external radial bearings 112 facilitate rotation of shaft 104. There is no direct exposure of the bearings with thermal bearing 110 or radial bearings 112 to a flowing heating medium or to flowing polymer on the drive end (left end FIG. 5A). Preferably, the interior of the system is sealed and under high vacuum (typically to withstand a pressure operating range from 50 psig (2.4 kPa) pressure to a negative pressure of 750 mm Hg (100 kPa) absolute vacuum). At each end of housing 102 a shaft-housing interface is sealed with double mechanical seals 114. Polymer product flows through an outlet 118 via conduit 119 to a discharge device 130 (like discharge apparatus 39, FIG. 4) which moves the polymer product from thermal dryer 100 for further processing. Coupling 120 allows injection of heat transfer media, such as hot oil, into the rotating main shaft 104 of thermal dryer 100. A channel in shaft 104 extends only to inlet 116 so that the heating medium does not heat apparatus beyond inlet 116. As with the system of FIG. 1, a vacuum system may be used with thermal dryer 100 to remove residuals. Thermal dryers are commercially available from Krauss-Maffei Verfahrenstechnik GmbH and List AG.

Figure 5B:
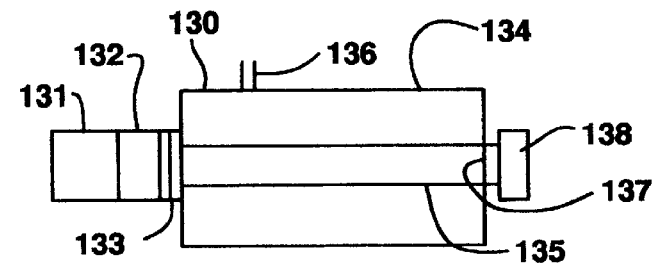
FIG. 5B is a side view of a conveyor shown in FIG. 5A.

A single screw discharge device 130 (FIG. 5A), as depicted in FIG. 5B, is used to convey polymer product from thermal dryer 100 to downstream equipment. Single screw device 130 comprises a housing 134, a direct drive motor 131, bearings 132 (typically including a back-thrust bearing and a roller bearing) to support a single screw 135 and to absorb the thrust of the screw, a double mechanical seal 133 to isolate components disposed within housing 134 from atmospheric contamination and prevent atmospheric oxygen intrusion. Polymer product enters device 130 via inlet 136, (connected to outlet 118 of FIG. 5a via conduit 119), is conveyed by screw 135 to discharge 137, and flows through discharge flange 138.

Advantages of using single screw device 130 or like device include less mechanical drive complexity; true screw integrity providing good sealing capability (that is, less run-out and an ability to use a double mechanical seal); lower shear enabling better quality polymer product (less shear induced degradation); more efficient pumping of polymer from inlet to outlet (less slippage); and better temperature control for downstream handling (such as pelletization).

Polymers useful in this invention include but are not limited to EPDM, heterogeneous polyethylene, for example, LLDPE polymerized as described in U.S. Pat. No. 4,076,698 (Andersen et al), the disclosure of which is incorporated herein by reference for all purposes; homogeneous polyethylene, as described in U.S. Pat. No. 3,645,992 (Elston), the disclosure of which is incorporated herein by reference for all purposes; substantially linear polyethylene as described in U.S. Pat. Nos. 5,272,236 or 5,278,272 (Lai et al.), the disclosure of each of which is incorporated herein by reference for all purposes; low density polyethylene (LDPE), and other thermoplastics such as polypropylene, including those thermoplastics made in a solution, slurry or high pressure polymerization processes. Other polymers and copolymers include SIS and SBS type polymers, PELLATHANE™ (a trademark of The Dow Chemical Company) polyurethane, ethylene-polypropylene rubbers (EPR s), and polystyrene. The novel methods described and claimed herein are surprisingly useful for high molecular weight, high viscosity elastomeric polymers.

Figure 6:
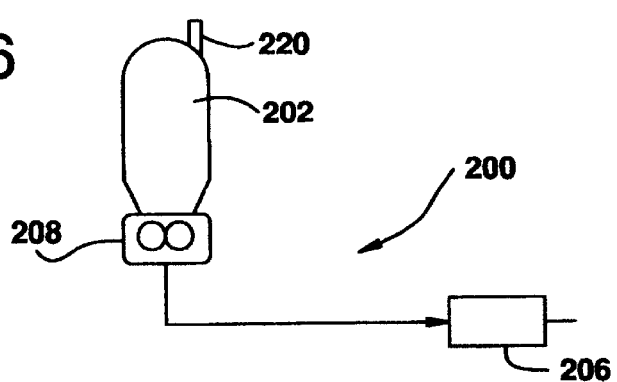
FIG. 6 is a schematic view of a second system useful in methods according to the present invention.

FIG. 6 shows one system 200 useful in a continuous process according to the present invention. Polymer solution enters a devolatilization vessel 202 via line 210 and solvent flashes off through an outlet 220. Polymer solution pools into an inlet of gear pump 208 and flows from it to a thermal dryer system 206 (like that of FIGS. 1–5B) and additional solvent is removed as described above. One or more additional devolatilization reactors may be used between the reactor 202 and the thermal dryer 206. In one aspect, the polymer-solvent solution is 50 percent to 70 percent by weight polymer and, therefore, is 50 percent to 30 percent by weight residuals.

EXAMPLES

In certain methods according to the present invention, ethylene propylene diene monomer ("EPDM") pellets as follows are fed to the dissolver extruder. Nordel™ material contains Irganox™ 1076 (a hindered phenolic antioxidant made by Ciba Geigy) in varying concentrations ranging between 100 ppm and 200 ppm.

| EPDM Type* (electrical grade) | Specific Gravity | Mooney Viscosity |
|---|---|---|
| Nordel ® 2722 | 0.87 | 25 ± 5 |
| Nordel ® 3681 | 0.87 | 45 ± 6 |
| Nordel ® 5892 | 0.87 | 58 ± 5 |

*Pellet size of 0.125 inches(0.3 cm) Nordel ™ is a trademark of DuPont Dow Elastomers L.L.C.

The dissolver extruder is a Werner and Pfleiderer Co. Model ZSK-30, co-rotating, fully intermeshing, twin screw, 30 millimeter (mm) extruder with a length over diameter (L/D) ratio of 21:1 in the extruder configuration with the screws being just over 20:1. The extruder is equipped with a Werner and Pfleiderer Co. high pressure injector located in the third downstream barrel section and is powered by a class one, division two, 15 horsepower, 3600 revolutions per minute alternating current motor, controlled by a digital speed controller. The extruder is starve fed resin by a K-Tron twin auger volumetric feeder, (with one of the two augers removed). The feed hopper on the feeder is loaded by hand and has a capacity of 10–20 pounds (3.7–7.5 kg). With one of the screws removed the feeder had a feed rate of 0–100 lb/hr (0–45 kg/hr).

In examples described below, the solvent used is Isopar™ E solvent (made by Exxon Chemical) and in one aspect Isopar™ E solvent mixed with n-nonane, a $C_9$ hydrocarbon, at a level of two percent by weight (to simulate residual diene since it has a higher boiling point than the Isopar™ E solvent).

The thermal dryer used in processing the three types of EPDM has a horizontal shell and a rotating shaft as shown in FIG. 1. Heat transfer media is pumped through the shell shaft and disc elements. The discs have mixing bars on their tips for clearing shell interior surfaces of product accumulation. Stationary counter hooks (see hooks 59, FIG. 4) are secured to the shell's interior and are shaped to interact with the rotating parts producing a mixing and kneading action. The discs are placed on the shaft at an angle to provide forward momentum and consistent product discharge. The dryer has a total volume of about 17 liters. A discharge apparatus 39 of the dryer is a twin screw extruder (having a Length-to-Diameter ratio of 7) powered by an hydraulic drive. The discharge section of the shell is attached to the middle section to give the discharge twin screw a horizontal position. As polymer is pushed forward by discs on the shaft, it is picked up by the twin screw and extruded through die holes located in an end flange.

Heat to the dryer is provided by a 40 watt exterior hot oil system. The hot oil system has its own pump and temperature controller providing hot oil to the thermal dryer at a desired temperature set point (for example 150–220° C.). Hot oil is piped through a rotary union to the shaft (a hollow tube) and disc elements. The thermal dryer is made of three sections that are bolted together. Each of the three sections is jacketed and heat is provided by hot oil on the jacket side of each of these sections. The vent dome, (attached to the top of the unit by a flange connection), is channeled and hot oil flows through these channels to keep the dome hot.

The hydraulic drive system comprises two separate hydraulic units. One unit powers the main drive of the dryer which turns the shaft and the other unit powers the small twin screw drive. Both units have a rectangular shaped closed oil reservoir with high pressure oil pumps powered by alternating current motors mounted on the tops of the reservoirs. Maximum pressure of the units is adjustable with an internal relief valve. Hydraulic oil is discharged from the pump through a hand adjustable flow valve. High pressure hydraulic lines are attached to the units and power drives using hydraulic line quick disconnects. Hydraulic lines return from the drives back to oil reservoirs. Pressure gauges on the hydraulic drive units are used to estimate torque on the agitator and twin screw extruder. By adjusting the position of the discharge valve on one unit, the flow rate and thus the speed of the drive to which it is connected are adjustable. Maximum pressures at the agitator shaft are 150 bar (15 MPa).

An oil sealed vacuum pump is used for the vacuum system. A shell and tube heat exchanger is used as a condenser between the vent dome and the vacuum system, with chilled glycol on the shell side at 1–5° C. Condensed vapors are collected in one of two condensate traps (10 gallon (38 L) stainless steel vessels) placed on weigh scales to measure rate. When one trap is full, the other trap is valved in while the first trap is emptied to a solvent drum by padding the trap with nitrogen. The vacuum level in the dryer unit and in the vacuum lines is measured via a valved-in connection with a mercury filled manometer. The traps are equipped with gauges to measure vacuum level.

Initially, a flange with three holes approximately ⅛ inch (0.3 cm) in diameter with one hole plugged is used as a die for the twin screw on the dryer. Later one hole is enlarged to 3/16 inch (0.5 cm) and the other two are plugged. The melt is extruded into a 12 foot (3.7 m) long water bath, and then pelletized with a Cumberland Strand Chopper.

BATCH METHOD

In a batch method according to the present invention, the drive system, vacuum system and heating system are as described above. The dryer is also used, but is shortened by about fifty percent in length (one section only is used) and the discharge extruder is replaced with an end plate. Samples are prepared for this trial by placing about 1 kg of Isopar™ E solvent in a bag along with about 1 kg of polymer. The polymer then absorbs the solvent and equilibrates. The samples range from a gelatinous consistency of 25 Mooney viscosity to a semi-solid material of about 70 Mooney viscosity. The dryer is loaded with the contents of such bags and the material is processed as described above.

This batch method data and results are shown in Table I. The data demonstrate substantially improved, unexpected results. Certain material is devolatilized from a solvent content of 50 percent by weight to less than 0.2 percent by weight.

In Table I, Products No. 1470 and 2522 are Nordel™ materials; "Oil Temp C." is the temperature of the heat transfer media in the thermal dryer; "Agitator RPM" is the speed of the shaft in the thermal dryer; "Vacuum (mm Hg(kPa))" is the vacuum level in the system; "Batch Time" is the residence time (in minutes) in the thermal dryer; "$N_2$ Sweep" is the amount of nitrogen injected into the thermal dryer in standard cubic feet per hour (standard cubic meters per hour); "Prod. Temp. °C." is the temperature of the output polymer in degrees Celsius; "Mooney Viscosity" is the viscosity of the output polymer; and "Volatiles ppm" is the volatiles (residuals) level of the output polymer.

CONTINUOUS METHOD

Table II presents the run conditions of the dissolver extruder for 24 samples in a continuous method according to the present invention. Because of the free volume area of the screws in the feed throat of the 30 mm twin screw extruder, only samples of EPDM in ⅛ inch (0.3 cm) pellet form were used. On start up of the dissolver extruder, low feed rates to the extruder of low Mooney viscosity EPDM (20 pounds/hour (7.5 kg/hr) Nordel™ 2722), are used to form an initial melt seal within the extruder before starting any solvent feed to the extruder. The dissolver extruder is run at low rates without solvent until polymer flow is established in the thermal dryer. High extruder discharge pressures (for example greater than 1000 psi (7 MPa)) is necessary to clear the line (½ inch (1.3 cm) on inside diameter) between the dissolver extruder discharge and the dryer. Solvent is injected into barrel zone three (barrel section 25, FIG. 1), through a high pressure injector with a back pressure of 600–800 psig (4.1–5.5 MPa). Percent solvent-to-EPDM by weight is kept low (10–20 percent) initially. When solvent is being fed to the extruder, a detector at the feed throat is used to check for solvent flashing back to the feed hopper. After establishing solvent to the extruder with no problems, the percent solvent to EPDM ratio is increased to a 50 weight percent level over a three or four step process. As the relation of the solvent percentage EPDM members, total motor torque decreases, allowing much higher throughput rates than dry (that is, containing no solvent) EPDM materials. Desired rates are achieved by increasing polymer addition rates first and then increasing solvent flow rates. Maximum solvent addition is limited to 25–27 pounds/hour metric (9.3–10 kg/hr) because of pump (pump 30, FIG. 1) limitations. Samples 1–8 and 22–24 are Nordel™ 5892 material. Samples 9–15 are Nordel™ 2722 material. Samples 16–21 are Nordel™ 3681 material.

In Table II, "Polymer Mooney" is the viscosity of the input polymer; "Polymer Feed" is the rate of input polymer feed to the thermal dryer in pounds per hour (kg/hr); "Solvent Feed" is the rate of solvent feed to the thermal dryer in pounds per hour (kg/hr); "Res Time min" is the residence time (calculated average) in minutes of the polymer-solvent solution in the thermal dryer; "Torque Bar" is the drive motor torque measured in bars (MPa); Other column headings have the same meaning as in Table I.

The temperature of the 50 percent EPDM stream is 180 to 220° C. To control the discharge temperature of the dissolver extruder at around 200° C., the screw speed is adjusted up or down within a limited range. The maximum screw speed of the dissolver extruder is 600 revolutions per minute, while the lower limit is set by drive torque and/or high percent fill of the screws. Partially closing the valve on the polymer line going to the thermal dryer (that is increasing the extruder discharge pressure) also increases discharge temperature. Screw speed, discharge pressure, and control of the extruder barrel zone temperatures (barrel zones 23, 25, 27, 28, 29), are all used so that the polymer supply to the thermal dryer remains in the target temperature range.

The dissolver extruder runs at steady amp loads and steady discharge pressures, all indicative of good solvent incorporation. Samples of the solution are periodically taken manually via discharge line 69 (FIG. 3) and physically inspected to ensure that a uniform solution is being generated.

Table II presents the run conditions of the 24 samples. The dryer is preheated to 150° C. with the hot oil system before being fed a polymer stream. When the polymer stream is introduced to the unit, the hydraulic shaft drive is started and the shaft speed adjusted to the desired number of revolutions per minute. When solvent is added to the polymer stream, the vacuum is valved to the thermal dryer and adjusted to desired vacuum levels. Using sight glasses on top of the dryer, polymer level in the dryer is monitored. When the desired level is reached, the twin screw hydraulic drive unit is started up. By adjusting the speed of the twin screw, the amount of polymer being discharged from the unit can be matched to the amount of polymer entering, and in this manner the level in the thermal dryer remains relatively constant.

Figure 7:
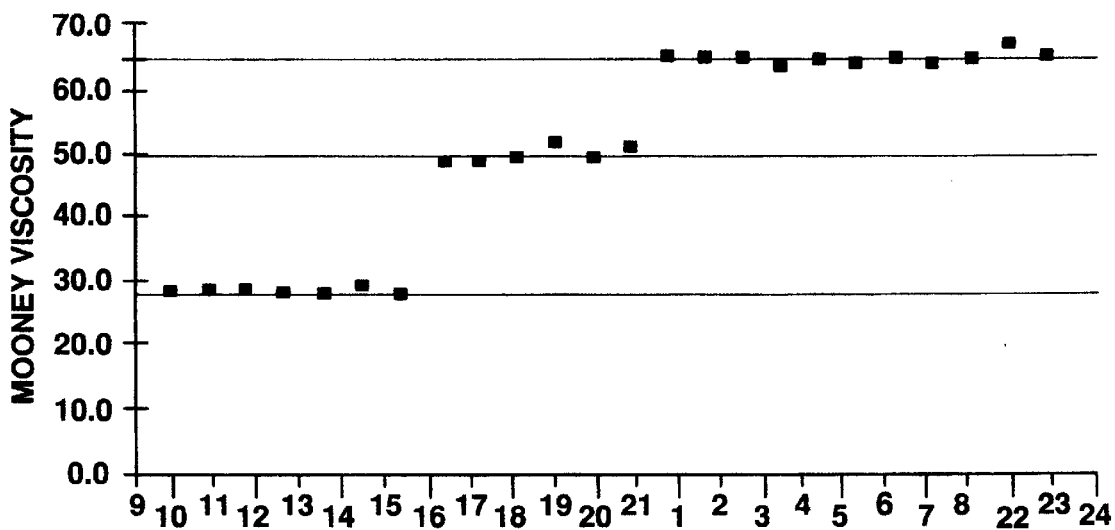

Product consistency is characterized by Mooney viscosities. FIG. 7 shows the Mooney viscosity for the 24 samples on the left vertical axis and the sample number on the horizontal axis. The three solid horizontal lines represent the starting Mooney viscosities for the EPDM materials. In all cases, unexpectedly, little or no Mooney drop is experienced. Residence times of the polymer in the dryer are as long as 41 minutes, with discharge melt temperatures as high as 287° C. Shaft speeds in the dryer as high as 70 revolutions per minute are evaluated and torque loads as high as 139 bar metric (13.9 MPa) (as measured on the hydraulic drive unit) are observed. None of these conditions produce any significant polymer degradation. The Nordel™ EPDM products contain standard antioxidant packages (for example, 1500 ppm Irganox™ 1076 (a hindered phenolic antioxidant made by Ciba-Geigy Corporation).

Devolatilization performance is measured by headspace gas chromatography of the final products. This is accomplished by sampling the head-space of a sealed sample vial containing final product from the thermal dryer within a few seconds (that is, within less than 15 seconds) of discharge. For each sample, a known amount of product (approximately 0.5 gram) is placed in a septum sealed vial. The sample vial is placed on an automated headspace analyzer connected to a gas chromatograph. The sample vial contents are then analyzed using a quantitative multiple headspace extraction procedure. The concentration of the residual solvent in the sample vial is determined from the quantitative analysis of known solvent standards analyzed under identical multiple headspace extraction conditions.

Figure 8:
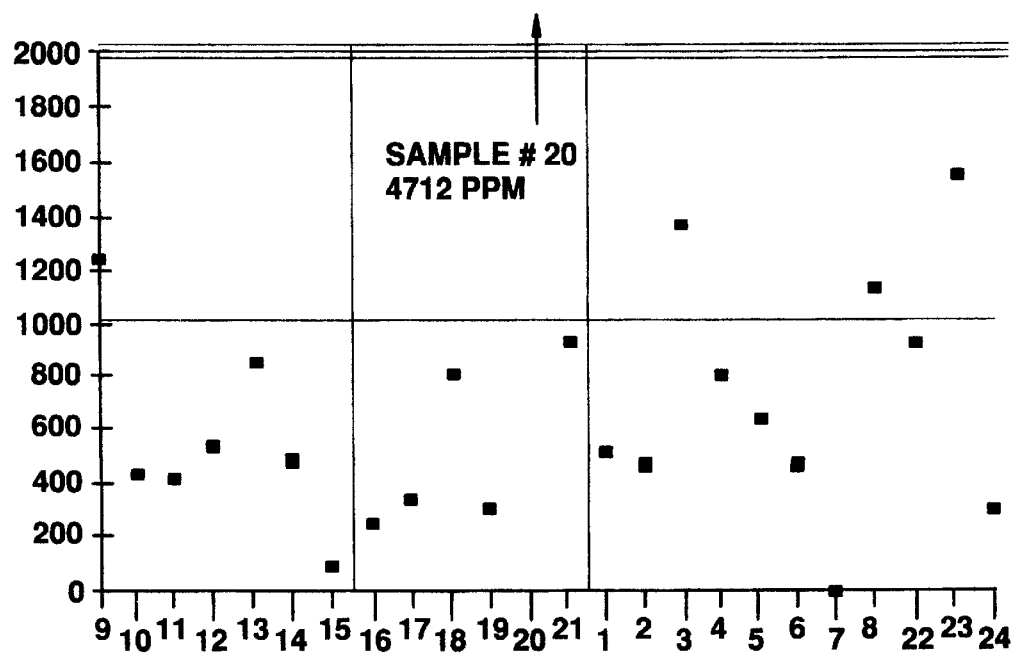

FIG. 8 presents the residual levels (vertical axis indicates parts per million (ppm) Isopar™ E solvent) for the 24 samples (sample number indicated on horizontal axis). Only one sample is above 2,000 ppm and it was run with a vacuum level of 200 mm Hg (27 kPa). Within the ranges of temperature, vacuum level, residence time and other variables, 19 samples unexpectedly fell below 1,000 ppm residual solvent.

Typically the devolatilization of EPDM materials with prior art extrusion equipment results in vent fouling due to snowing. EPDM rubbers with higher viscosities typically have a greater problem. In the vent dome of the dryer, only a small amount of snow is present in the lower portion or section of the dome. Accumulation over several hours of running time is minor. This represents an unexpected result of the present invention.

Figure 9:
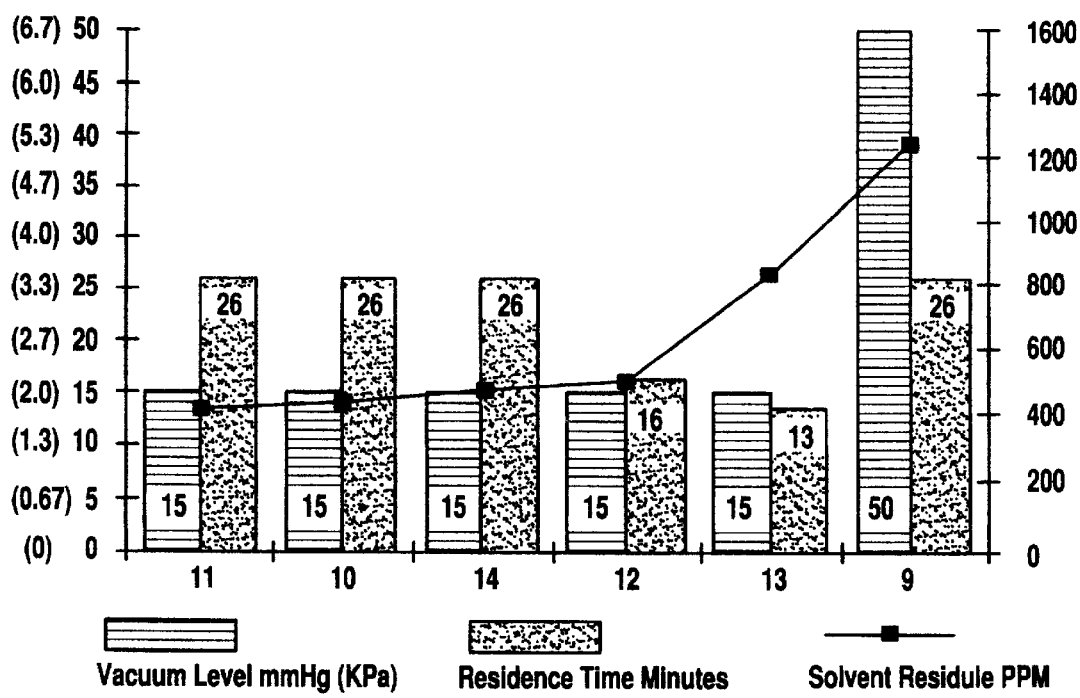

FIG. 9 shows the relationship of vacuum level, residence time, and the residual levels of devolatilized EPDM (Nordel™ 2722). Vacuum level in mm Hg absolute (with value in kPa being indicated in parentheses) is set forth on the left vertical axis, and is indicated as the first bar in each pair of bars for each sample. Residence time in minutes is also set forth on the left vertical axis (the values which are not enclosed in parentheses, e.g., 50, 45, etc.), and is indicated as the second bar in each pair of bars for each sample. Solvent residuals in parts per million is set forth on the right vertical axis, and is indicated by the connected plotted small boxes. Sample number is indicated on the horizontal axis. For FIG. 9, the polymer contains from 25 to 50 percent solvent upon entering the dryer, and the dryer is filled to 40 percent.

As set forth in FIG. 9, as vacuum level increases and or residence time decreases, the residual solvent level in the polymer increases. One sample, sample number 15, is not included in data supporting FIG. 9 because its starting percent solvent level in the EPDM is low (10 percent).

Figure 10:
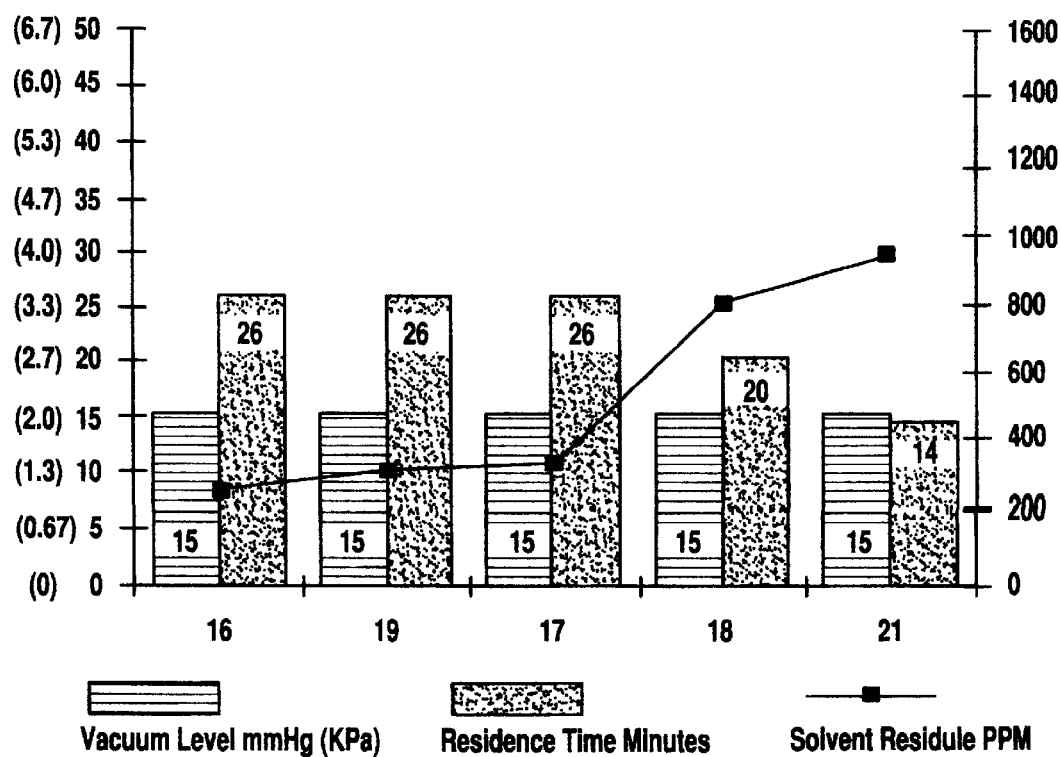
Figure 11:
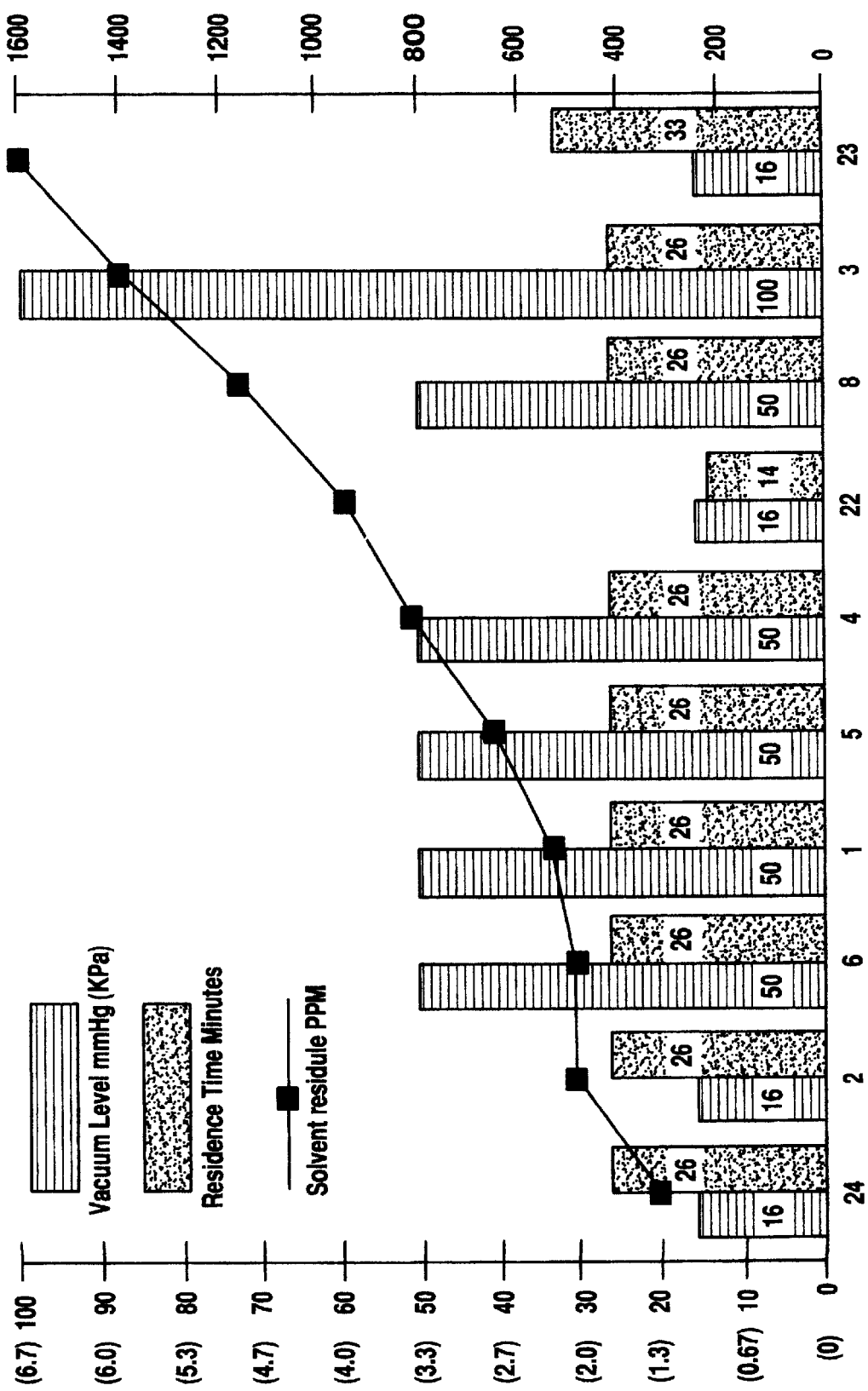

FIGS. 10 and 11 also show the same relationship as FIG. 9 (with the axis and bars being defined as described above with respect to FIG. 9), but with the other EPDM materials (Nordel™ 3681 and Nordel™ 5892). Also, for FIG. 10, the polymer contains from 40 to 50 percent solvent upon entering the dryer and the dryer is filled to 25 to 40 percent, while, for FIG. 11, the polymer contains from 40 to 50 percent solvent and the dryer is filled to 40 to 50 percent. The same trends can be seen for these two EPDM's as for that of FIG. 9. In FIG. 11, one sample is again left out (sample number 7) because of a low starting solvent level (12 percent).

Table III presents information regarding certain samples referred to in FIGS. 9, 10, and 11. Certain variables are varied for these samples, including how full the thermal dryer is ("Fill percent"); whether nitrogen is present and, if so how much, ("N$_2$ SCFH (m$^3$/hr)"); rotational speed of the thermal dryer shaft ("RPM"); the amount of material being fed to the thermal dryer, polymer plus solvent, in pounds per hour ("Total Feed lb/hr"); the temperature of the heat transfer media as it is fed to the thermal dryer, 150° C., or any indication that it is not used ("Oil Temp (°C.)"); and the amount of solvent as a weight percent of the total feed to the thermal dryer ("Solvent percent").

Samples 7 and 15 in Table II have starting solvent levels in the range of 10 percent by weight. The two samples are run under different conditions, but the devolatilized EPDM final product, unexpectedly has residual levels of less than 100 ppm.

Two-thirds of the samples are run with a nitrogen sweep of the dryer at a level of 2 to 5 standard cubic feet per hour (0.06 to 0.14 m$^3$/hr). The rest of the samples are run without nitrogen. Table II presents three pair of samples, one of each of the three different EPDM materials, with and without nitrogen sweep. These sample pairs are run under the same conditions except for the nitrogen. The data indicates lower solvent residual levels for the Nordel™ 3681 and Nordel™ 5892 with nitrogen. The Nordel™ 2722 samples show statistically the same residual level.

Figure 12:
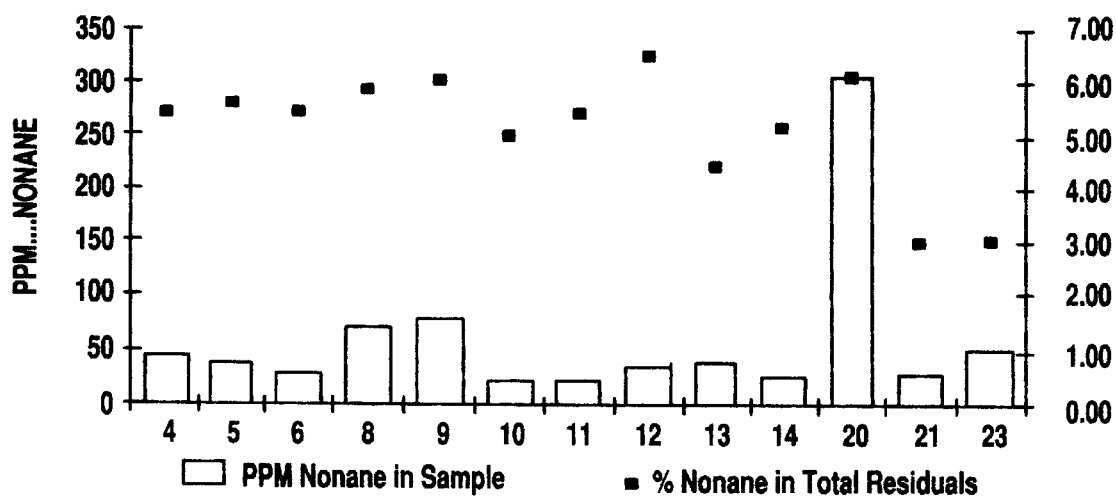

Some of the samples are collected after adding about 2 percent n-nonane by weight to the Isopar™ E solvent. The samples are tested for n-nonane residuals and the data is presented in FIG. 12. (The right vertical axis of FIG. 12 shows the weight percent of n-nonane in the total residuals). N-nonane is present in the total residuals in a 3–6.5 percent by weight range).

Three different temperature profiles are used for the above described samples. First, the hot oil system runs at 200° C. and the jacket side of the shell on all three sections of the dryer and the vent dome are valved in. Hot oil temperatures of the hot oil system have an average 5° C. change (in versus out). Polymer temperatures range from 211° C.–233° C. in the second section of the dryer. The second condition runs the hot oil system at 150° C. with the jacket side of the shell on all three sections of the dryer and the vent dome valved in. Hot oil temperatures in and out of the hot oil system have a change of 3° C. Polymer temperatures range from 167–187° C. at the same point. The third condition runs the hot oil system at 150° C. with the vent dome valved in and all three sections of the unit valved out after the dryer is running. The polymer temperatures range from 115–205° C.

Figure 13:
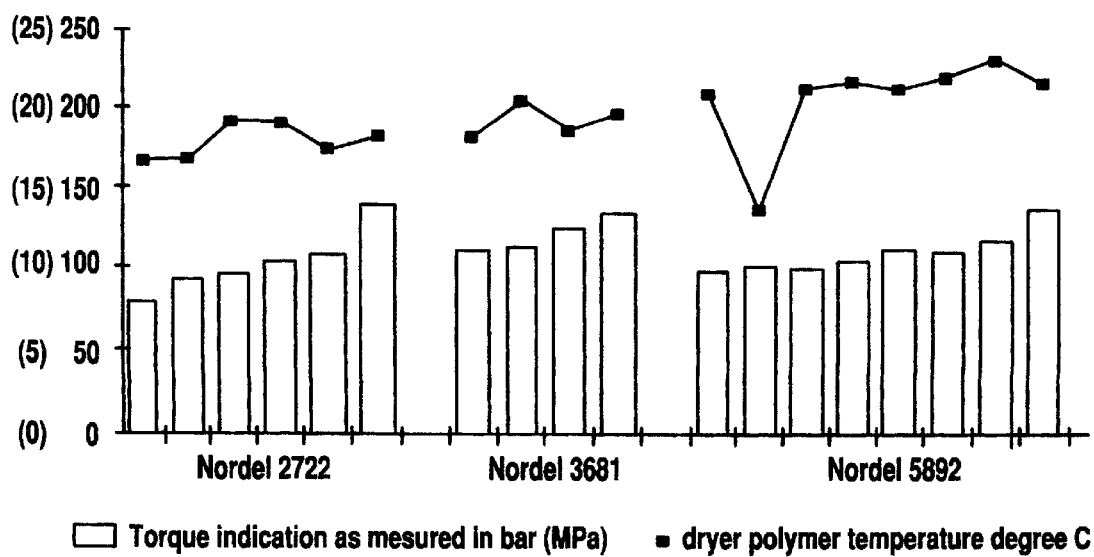

FIG. 13 presents data for the three different Nordel™ EPDM materials run at the same dryer fill level (40 percent), dryer shaft rotation speed (50 rpm), and approximately the same dryer residence time (26 minutes). Both the temperature of the EPDM materials in the dryer and the peak recorded hydraulic pressure required to turn the shaft at 50 RPM's are shown. The vertical axis shows the torque measured in bar (with the value in MPa being set forth in parentheses). The vertical axis further shows the dryer polymer temperature in °C. (the value on the vertical axis which is not in parentheses, that is 250, 200, 150, etc.). This data, unexpectedly, shows no significant difference in torque requirements between the 27 Mooney, 50 Mooney, and the 65 Mooney EPDM materials. A possible reason for the similarity in torque requirements for the three different EPDM materials is a change in condition of the polymer melt at the varying temperatures (from a continuous melt to a discontinuous melt, that is, crumbs). The average temperatures are: 27 Mooney viscosity material=180° C., 50 Mooney viscosity material=190° C., and 65 Mooney viscosity material=215° C. If these temperatures are reached through a mechanical means, there would have been higher torque requirements for the higher Mooney EPDM materials.

Data regarding thermal dryer run conditions, presented in FIG. 14–16, shows sample differences and torque requirement similarities. In each of FIG. 14–16, the vertical axis shows torque requirement in bar (with the value in MPa being set forth in parentheses. In each of FIG. 14–16, the vertical axis further shows disc temperature in °C. (the value on the vertical axis which is not in parentheses, that is 240, 220, etc.)

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. section 102 and satisfies the conditions for patentability in section 102. The invention claimed herein is not obvious in accordance with 35 U.S.C. section 103 and satisfies the conditions for patentability in section 103. This specification and the claims that follow are in accordance with all of the requirements of 35 U.S.C. section 112.

TABLE II

| Trial No. | Polymer Mooney | Polymer Feed lbs/hr (kg/hr) | Solvent Feed lbs/hr (kg/hr) | Oil Temp (° C.) | Agitator RPM | Vacuum mm Hg (kPa) | Res. Time min | N₂ Sweep scfh (m³/h) | Prod. Temp (° C.) | Torque Bar (MPa) | Mooney Viscosity | Volatiles ppm |
|---|---|---|---|---|---|---|---|---|---|---|---|---|
| 1 | 65 | 30 (11) | 30 (11) | 200 | 50 | 50 (6.7) | 26 | 5 (0.14) | 215 | 111 (11.1) | 64.3 | 522 |
| 2 | 65 | 30 (11) | 30 (11) | 200 | 50 | 15 (2.0) | 26 | 2 (0.056) | 214 | 100 (10.0) | 65.1 | 484 |
| 3 | 65 | 30 (11) | 30 (11) | 200 | 50 | 100 (13.3) | 26 | None | 214 | 98 (9.8) | 64.6 | 1403 |
| 4 | 65 | 30 (11) | 30 (11) | 200 | 50 | 50 (6.7) | 26 | None | 222 | 111 (11.1) | 65.3 | 817 |
| 5 | 65 | 40 (15) | 30 (11) | 200 | 50 | 50 (6.7) | 26 | 5 (0.14) | 218 | 136 (13.6 | 64.7 | 657 |
| 6 | 65 | 30 (11) | 20 (7.5) | 200 | 50 | 50 (6.7) | 26 | 5 (0.14) | 219 | 104 (10.4) | 65 | 486 |
| 7 | 65 | 20 (7.5) | 2 (0.7) | 200 | 50 | 15 (2.0) | 41 | 5 (0.14) | 233 | 118 (11.8) | 67.5 | <20 |
| 8 | 65 | 30 (11) | 30 (11) | 150 | 50 | 50 (6.7) | 26 | 5 (0.14) | 187 | 118 (11.8) | 65.8 | 1159 |
| 9 | 25 | 30 (11) | 30 (11) | 150 | 50 | 50 (6.7) | 26 | 5 (0.14) | 167 | 80 (8.0) | 28.2 | 1241 |
| 10 | 25 | 30 (11) | 30 (11) | 150 | 50 | 15 (2.0) | 26 | 5 (0.14) | 165 | 78 (7.8) | 28.5 | 434 |
| 11 | 25 | 30 (11) | 30 (11) | 150 | 50 | 15 (2.0) | 26 | None | 167 | 91 (9.1) | 28.8 | 419 |
| 12 | 25 | 60 (22) | 30 (11) | 150 | 60 | 15 (2.0) | 16 | None | 175 | 107 (10.7) | 28.3 | 512 |
| 13 | 25 | 80 (30) | 30 (11) | 150 | 70 | 15 (2.0) | 13 | None | 182 | 139 (13.9) | 28.2 | 836 |
| 14 | 25 | 30 (11) | 30 (11) | None | 50 | 15 (2.0) | 26 | None | 192 | 104 (10.4) | 29.1 | 477 |
| 15 | 25 | 36 (13) | 4 (1.5) | None | 50 | 15 (2.0) | 25 | 5 (0.14) | 187 | 94 (9.4) | 28 | 100 |
| 16 | 45 | 30 (11) | 30 (11) | None | 50 | 15 (2.0) | 26 | 5 (0.14) | 183 | 109 (10.9) | 49 | 257 |
| 17 | 45 | 30 (11) | 30 (11) | None | 30 | 15 (2.0) | 26 | 5 (0.14) | 151 | 95 (9.5) | 49.3 | 341 |
| 18 | 45 | 40 (15) | 30 (11) | None | 50 | 15 (2.0) | 20 | 5 (0.14) | 187 | 124 (12.4) | 49.8 | 806 |
| 19 | 45 | 30 (11) | 30 (11) | None | 50 | 15 (2.0) | 26 | None | 205 | 111 (11.1) | 51.9 | 317 |
| 20 | 45 | 30 (11) | 30 (11) | None | 50 | 200 (26.6) | 26 | None | 198 | 133 (13.3) | 49.6 | 4712 |
| 21 | 45 | 30 (11) | 30 (11) | None | 50 | 15 (2.0) | 14 | 5 (0.14) | 149 | 58 (5.8) | 50.8 | 941 |
| 22 | 65 | 30 (11) | 30 (11) | None | 50 | 15 (2.0) | 14 | 5 (0.14) | 128 | 48 (4.8) | 65.4 | 948 |
| 23 | 65 | 30 (11) | 30 (11) | None | 30 | 15 (2.0) | 33 | 5 (0.14) | 134 | 111 (11.1) | 65.4 | 1597 |
| 24 | 65 | 30 (11) | 30 (11) | None | 50 | 15 (2.0) | 26 | 5 (0.14) | 203 | 100 (10.0) | 65.6 | 334 |

TABLE III

| Figure | Sample | Vacuum mm Hg (kPa) | N₂ scfh (m³/h) | Residence Time (min) | Fill (%) | RPM | Total Feed lb/hr (kg/hr) | Oil Temp (° C.) | Solvent (%) |
|---|---|---|---|---|---|---|---|---|---|
| 9 | 11 | 15 (2.0) | None | 26 | 40 | 50 | 57 (21) | 150 | 47 |
| 9 | 10 | 50 (6.7) | 5 (0.14) | 26 | 40 | 50 | 57 (21) | 150 | 47 |
| 9 | 14 | 15 (2.0) | None | 26 | 40 | 50 | 57 (21) | Oil off | 48 |
| 9 | 12 | 15 (2.0) | None | 16 | 40 | 50 | 87 (32) | 150 | 31 |
| 9 | 13 | 15 (2.0) | None | 13 | 40 | 50 | 10 (40) | 150 | 25 |
| 9 | 9 | 50 (6.7) | 5 (0.14) | 26 | 40 | 70 | 57 (21) | 150 | 47 |

TABLE III-continued

| Figure | Sample | Vacuum mm Hg (kPa) | N₂ scfh (m³/h) | Residence Time (min) | Fill (%) | RPM | Total Feed lb/hr (kg/hr) | Oil Temp (° C.) | Solvent (%) |
|---|---|---|---|---|---|---|---|---|---|
| 10 | 16 | 15 (2.0) | 5 (0.14) | 26 | 40 | 50 | 57 (21) | None | 48 |
| 10 | 19 | 15 (2.0) | None | 26 | 40 | 50 | 57 (21) | None | 47 |
| 10 | 17 | 15 (2.0) | 5 (0.14) | 26 | 40 | 30 | 57 (21) | None | 48 |
| 10 | 18 | 15 (2.0) | 5 (0.14) | 20 | 40 | 50 | 67 (25) | None | 41 |
| 10 | 21 | 15 (2.0) | 5 (0.14) | 14 | 25 | 50 | 57 (21) | None | 47 |
| 11 | 24 | 15 (2.0) | 5 (0.14) | 26 | 40 | 50 | 57 (21) | None | 47.4 |
| 11 | 2 | 15 (2.0) | 2 (0.056) | 26 | 40 | 50 | 56 (21) | None | 47 |
| 11 | 6 | 50 (6.7) | 5 (0.14) | 26 | 40 | 50 | 48 (18) | None | 38 |
| 11 | 1 | 50 (6.7) | 5 (0.14) | 26 | 40 | 50 | 55 (20) | None | 46 |
| 11 | 5 | 50 (6.7) | 5 (0.14) | 26 | 40 | 50 | 66 (25) | None | 39 |
| 11 | 4 | 50 (6.7) | None | 26 | 40 | 50 | 55 (20) | None | 46 |
| 11 | 22 | 15 (2.0) | 5 (0.14) | 14 | 25 | 50 | 59 (22) | None | 49 |
| 11 | 8 | 15 (2.0) | 5 (0.14) | 26 | 40 | 60 | 57 (21) | None | 47 |
| 11 | 3 | 100 (13.3) | None | 26 | 40 | 50 | 57 (21) | None | 47 |
| 11 | 23 | 15 (2.0) | 5 (0.14) | 33 | 50 | 30 | 57 (21) | None | 47 |

TABLE IV*

| MOONEY | inlet temp ° C. | vacuum mmHg (kPa) | shaft RPM | shaft TORQUE ft lbs (kg.m) | poly temp ° C. | Extruder RPM | Extruder discharge temp ° C. | Extruder discharge psig (MPa) | Volatiles ppm ENB | Volatiles ppm TOTAL |
|---|---|---|---|---|---|---|---|---|---|---|
| 69.4 | 146.3 | 14.2(1.89) | 29.4 | 667.2(92.24) | 202.9 | 66.8 | 212.3 | 218.2(1.504) | 9.0 | 258.0 |
| 63.3 | 144.5 | 14.8(1.97) | 29.4 | 630.4(87.16) | 202.7 | 66.8 | 211.3 | 205.3(1.415) | 8.0 | 199.0 |
| 70.2 | 147.7 | 14.5(1.93) | 29.4 | 632.2(87.41) | 203.5 | 66.7 | 213.8 | 219.2(1.511) | 5.0 | 111.0 |
| 65.7 | 146.4 | 14.6(1.95) | 29.4 | 636.3(87.97) | 206.4 | 59.9 | 214.7 | 199.5(1.376) | 5.0 | 141.0 |
| 65.6 | 146.9 | 14.5(1.93) | 29.4 | 674.9(93.31) | 206.2 | 59.9 | 216.8 | 209.9(1.447) | 7.0 | 190.0 |
| 69.6 | 148.9 | 13.8(1.84) | 29.4 | 661.9(91.51) | 206.4 | 59.9 | 214.5 | 216.8(1.495) | 8.0 | 213.0 |
| 70.6 | 150.0 | 14.6(1.95) | 25.0 | 816.2(112.8) | 205.2 | 59.7 | 215.4 | 250.1(1.724) | 17.0 | 500.0 |
| 71.0 | 150.5 | 14.1(1.88) | 25.0 | 694.6(96.03) | 205.6 | 59.8 | 212.3 | 234.3(1.615) | 10.0 | 271.0 |
| 71.3 | 150.4 | 14.0(1.87) | 25.0 | 586.8(81.13) | 204.7 | 60.0 | 210.7 | 208.3(1.436) | 8.0 | 246.0 |
| 71.4 | 150.7 | 14.5(1.93) | 20.0 | 755.9(104.5) | 204.7 | 59.9 | 209.7 | 227.7(1.570) | 15.0 | 445.0 |
| 70.4 | 150.4 | 14.4(1.92) | 20.0 | 811.3(112.2) | 204.9 | 59.9 | 208.3 | 238.8(1.646) | 12.0 | 337.0 |
| 70.7 | 150.1 | 14.6(1.95) | 20.0 | 829.6(114.7) | 204.8 | 59.8 | 206.9 | 244.9(1.689) | 11.0 | 315.0 |
| 71.3 | 150.6 | 15.0(2.00) | 15.1 | 938.1(129.7) | 205.5 | 59.8 | 208.9 | 249.0(1.717) | 20.0 | 565.0 |
| 71.7 | 149.8 | 14.0(1.87) | 15.0 | 845.3(116.9) | 204.2 | 59.9 | 201.4 | 226.7(1.563) | 6.0 | 153.0 |
| 70.6 | 149.4 | 13.8(1.84) | 15.0 | 780.0(107.8) | 204.4 | 59.9 | 202.8 | 230.5(1.589) | 15.0 | 422.0 |

*Total residuals on the feed was 23–24 ounces (650–680 grams)

TABLE V

| Sample Number | Dupont Nordel EPDM | Disc Screw rpm | Disc Torque Bar | Total Feed lbs/hr (kg/hr) | Solvent in feed | Hot Oil to Disc Temp ° C. | Disc No. 1 Temp ° C. | Disc No. 2 Temp ° C. | Disc No. 3 Temp ° C. | Discharge Melt Temp ° C. | Aprox. Fill Level (%) | Residence Time Minutes | Vacuum mm Hg (kPa) | N₂ Sweep SCFH (m³/hr) | Mooney Viscosity | Iso-par-E Volatiles ppm |
|---|---|---|---|---|---|---|---|---|---|---|---|---|---|---|---|---|
| 10 | 2722 | 50 | 78 (7.8) | 56.7 (21.2) | 47.1 | 150 | 155 | 155 | 167 | 178 | 40 | 26 | 15 (2.0) | 5 (0.14) | 28.5 | 434 |
| 11 | 2722 | 50 | 91 (9.1) | 57.4 (21.4) | 47.7 | 150 | 154 | 154 | 167 | 182 | 40 | 26 | 15 (2.0) | none | 28.8 | 419 |
| 15 | 2722 | 50 | 94 (9.4) | 40.2 (15.0) | 10.4 | none | 191 | 177 | 187 | 206 | 40 | 25 | 15 (2.0) | 5 (0.14) | 28.0 | 100 |
| 14 | 2722 | 50 | 104 (10.4) | 57.7 (21.5) | 48.0 | none | 156 | 162 | 192 | 190 | 40 | 26 | 15 (2.0) | none | 29.1 | 477 |
| 16 | 3681 | 50 | 109 (10.9) | 57.2 (21.3) | 47.6 | none | 134 | 141 | 183 | 196 | 40 | 26 | 15 (2.0) | 5 (0.14) | 49.0 | 257 |
| 19 | 3681 | 50 | 111 (11.1) | 57.8 (21.6) | 48.1 | none | 132 | 147 | 205 | 230 | 40 | 26 | 15 (2.0) | none | 51.9 | 317 |
| 18 | 3681 | 50 | 124 (12.4) | 67.2 (25.1) | 40.5 | none | 157 | 153 | 187 | 221 | 40 | 20 | 15 (2.0) | 5 (0.14) | 49.8 | 806 |
| 20 | 3681 | 50 | 133 (13.3) | 57.0 (21.3) | 47.4 | none | 140 | 144 | 198 | 225 | 40 | 26 | 200 (26.8) | none | 49.6 | 4712 |
| 3 | 5892 | 50 | 98 (9.8) | 56.7 (21.2) | 47.1 | 200 | 187 | 211 | 157 | 250 | 40 | 26 | 100 (13.4) | none | 64.6 | 1403 |
| 24 | 5892 | 50 | 100 (10.0) | 57.0 (21.3) | 47.4 | none | 35 | 134 | 137 | 287 | 40 | 26 | 15 (2.0) | 5 (0.14) | 65.6 | 334 |
| 2 | 5892 | 50 | 100 (10.0) | 56.3 (21.0) | 46.7 | 200 | 188 | 214 | 154 | 221 | 40 | 26 | 15 (2.0) | 2 (0.056) | 65.1 | 484 |

TABLE V-continued

| Sample Number | Dupont Nordel EPDM | Disc Screw rpm | Disc Torque Bar | Total Feed lbs/hr (kg/hr) | Solvent in feed | Hot Oil to Disc Temp °C | Disc No. 1 Temp °C | Disc No. 2 Temp °C | Disc No. 3 Temp °C | Discharge Melt Temp °C | Aprox. Fill Level (%) | Residence Time Minutes | Vacuum mm Hg (kPa) | N₂ Sweep SCFH (m³/hr) | Mooney Viscosity | Iso-par-E Volatiles ppm |
|---|---|---|---|---|---|---|---|---|---|---|---|---|---|---|---|---|
| 6 | 5892 | 50 | 104 (10.4) | 48.2 (18.0) | 37.8 | 200 | 196 | 219 | 159 | 230 | 40 | 26 | 50 (6.7) | 5 (0.14) | 65.0 | 486 |
| 1 | 5892 | 50 | 111 (11.1) | 55.0 (20.5) | 45.5 | 200 | 190 | 214 | 145 | 220 | 40 | 26 | 50 (6.7) | 5 (0.14) | 64.3 | 522 |
| 4 | 5892 | 50 | 111 (11.1) | 55.4 (20.7) | 45.8 | 200 | 190 | 222 | 140 | 241 | 40 | 26 | 50 (6.7) | none (0.14) | 65.3 | 817 |
| 5 | 5892 | 50 | 136 (13.6) | 65.7 (24.5) | 39.1 | 200 | 197 | 218 | 162 | 247 | 40 | 26 | 50 (6.7) | 5 (0.14) | 64.7 | 657 |

What is claimed is:

1. A method for devolatilizing a polymer-solvent solution, characterized by a single iteration of the following sequential steps:

(A) introducing a polymer-solvent solution having a solvent plus residuals content of less than 80 weight percent into a thermal dryer which has a horizontal shell and a rotating shaft inside the shell, disc elements placed in the shaft at an angle, and stationary counter hooks secured to the shell's interior, (B) treating the polymer-solvent solution in the thermal dryer to form product polymer and separated solvent, the separated solvent with residuals therein vaporizing in the thermal dryer to form a vapor containing solvent and residuals, (C) removing the vapor containing solvent and residuals from the thermal dryer, and (D) discharging from the thermal dryer polymer product having not more than 0.5 percent by weight solvent and residuals.

2. The method of claim 1 wherein solvent level in the polymer product is less than 2000 parts per million.

3. The method of claim 1 wherein the polymer is selected from the group consisting of EPDM, heterogeneous polyethylene, homogeneous polyethylene, linear polyethylene, low density polyethylene, polypropylene, ethylene propylene rubber, and polystyrene.

4. The method of claim 1 wherein the polymer is a terpolymer of ethylene, an alpha-olefin, and a diene, and wherein the residual diene level in the product polymer is less than 100 ppm.

5. The method of claim 1 wherein the product polymer is suitable for processing by a pelletizing machine and the method comprising further (E) feeding the product polymer to a pelletizing machine, and (F) producing pelletized product polymer with the pelletizing machine.

6. The method of claim 1 wherein the polymer has a melt index less than 1 g/10 minutes.

7. The method of claim 1 wherein the polymer-solvent solution has a residence time in the thermal dryer of less than 50 minutes.

8. The method of claim 1 wherein residuals are initially present in the polymer-solvent solution at a level of between 5% and 80% by weight.

9. The method of claim 8 wherein the residuals level in the product polymer is less than 0.2% by weight.

10. The method of claim 1 wherein residuals are initially present at a level of 10% to 50% by weight in the polymer-solvent solution and are reduced to a level of less than 1000 parts per million in the product polymer.

11. The method of claim 1 wherein residuals are initially present at a level of 2% to 25% by weight in the polymer-solvent solution and are reduced to a level of less than 500 parts per million in the product polymer.

12. The method of claim 1 wherein the solvent is a $C_5$ hydrocarbon or heavier hydrocarbon.

13. The method of claim 1 wherein the method is performed in the absence of at least one of oxygen and water.

14. The method of claim 1 further comprising the step of introducing at least one inert stripping agent in the thermal dryer.

15. The method of claim 14 wherein the inert stripping agent is nitrogen.

16. The method of claim 1 wherein the polymer-solvent solution is continuously fed to the thermal dryer and polymer product is continuously produced by and conveyed from the thermal dryer.

17. The method of claim 1 wherein product polymer discharged from the thermal dryer is received by a discharge apparatus which conveys the product polymer from the thermal dryer, wherein the discharge apparatus comprises a discharge system, the discharge device system comprising a single or twin screw conveyor rotatably mounted in a housing, the housing having an interior into which product polymer flows through a housing inlet, a direct drive motor at a drive end of the housing connected to the single or twin screw conveyor for rotating it, dual mechanical seals at the drive end of the housing for sealing an interface of the single or twin screw conveyor and the housing, bearings at the drive end for facilitating rotation of the single or twin screw conveyor, and an outlet for the product polymer to flow from the housing.

18. The method of claim 1 further comprising at least one of heating or agitating the polymer-solvent solution in the thermal dryer.

19. The method of claim 1 further comprising (E) feeding an initial polymer-solvent solution with a residuals level of 70% by weight or greater to a devolatilization reactor, (F) devolatilizing the initial polymer-solvent solution in the devolatilization reactor producing a feed polymer with a residuals level of 30% to 50% by weight, and (G) feeding the feed polymer-solvent solution to the thermal dryer to produce the polymer-solvent solution.

20. The method of claim 1 wherein temperature within the thermal dryer is maintained between 50° C. and 290° C.

21. The method of claim 1 wherein the vapor is removed by a vacuum system in fluid communication with the thermal dryer.

22. The method of claim 21 wherein a vacuum from 10 mm Hg to 200 mm Hg is maintained within the thermal dryer by the vacuum system.

23. The method of claim 21 further comprising (E) condensing and collecting solvent from the vapor removed by the vacuum system.

24. The method of claim 1 further comprising injecting nitrogen into the thermal dryer to facilitate residuals separation.

25. The method of claim 1 wherein the devolatilization of the polymer-solvent solution does not produce any significant polymer degradation.

26. A method for devolatilizing a polymer having a Mooney viscosity greater than 50, the method comprising (A) introducing a polymer-solvent solution into a thermal dryer, (B) treating the polymer-solvent solution in the thermal dryer forming polymer product and separated solvent forming product polymer and separated solvent, the product polymer having at most 0.5% by weight solvent, and other residuals, separated solvent with residuals therein vaporizing in the thermal dryer forming a vapor containing solvent and residuals, wherein the polymer-solvent solution has a residence time of less than 50 minutes in said dryer, (C) removing the vapor from the thermal dryer using a vacuum in fluid communication with said dryer from 10 mm Hg to 200 mm Hg, and (D) discharging product polymer with solvent removed therefrom from the thermal dryer.

27. A discharge system for use with a thermal dryer to dry a polymer product comprising:

a single or twin screw conveyor rotatably mounted in a housing, the housing having an interior into which product polymer flows through a housing inlet, a direct drive motor at a drive end of the housing connected to the single or twin screw conveyor for rotating it, dual mechanical seals at the drive end of the housing for sealing an interface of the single or twin screw conveyor and the housing, bearings at the drive end for facilitating rotation of the single or twin screw conveyor, and an outlet for the product polymer to flow from the housing.

* * * * *

UNITED STATES PATENT AND TRADEMARK OFFICE
CERTIFICATE OF CORRECTION

PATENT NO. : 6,150,498
DATED : November 21, 2000
INVENTOR(S) : Abel, Jr. et al.

It is certified that error appears in the above-identified patent and that said Letters Patent is hereby corrected as shown below:

<u>Column 8,</u>
Line 38, please delete "hooks 59, FIG. 4" and insert therefor -- hooks 58, FIG. 1 --;
Lines 44 and 48, please delete "twin screw" and insert therefor -- single screw --.

Signed and Sealed this

Twenty-sixth Day of July, 2005

JON W. DUDAS
*Director of the United States Patent and Trademark Office*